United States Patent
Sheikh

(10) Patent No.: US 8,063,949 B2
(45) Date of Patent: Nov. 22, 2011

(54) ACTIVITY-BASED SYSTEM AND METHOD FOR REDUCING GAIN IMBALANCE IN A BAYER PATTERN AND DIGITAL CAMERA EMPLOYING THE SAME

(75) Inventor: Hamid R. Sheikh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 583 days.

(21) Appl. No.: 12/047,411

(22) Filed: Mar. 13, 2008

(65) Prior Publication Data

US 2008/0231735 A1 Sep. 25, 2008

Related U.S. Application Data

(60) Provisional application No. 60/895,882, filed on Mar. 20, 2007, provisional application No. 60/909,429, filed on Mar. 31, 2007.

(51) Int. Cl.
*H04N 9/73* (2006.01)
*H04N 5/20* (2006.01)
*G06K 9/40* (2006.01)

(52) U.S. Cl. ......... 348/223.1; 348/255; 382/254
(58) Field of Classification Search ............ 348/230.1, 348/273, 609, 610, 617
See application file for complete search history.

(56) References Cited

U.S. PATENT DOCUMENTS

| 7,009,639 B1 * | 3/2006 | Une et al. ............... 348/223.1 |
| 7,826,656 B2 * | 11/2010 | Chiu ............................ 382/162 |
| 2002/0167602 A1 * | 11/2002 | Nguyen ..................... 348/280 |
| 2005/0088455 A1 * | 4/2005 | Chang ........................ 345/603 |
| 2006/0050159 A1 * | 3/2006 | Ahn ............................. 348/272 |
| 2006/0146149 A1 * | 7/2006 | Palum et al. ............... 348/272 |
| 2007/0165116 A1 * | 7/2007 | Hung et al. ................ 348/241 |

OTHER PUBLICATIONS

Munenori Oizumi, "Proximity-Based System and Method for Reducing Gain Imbalance in a Bayer Pattern and Digital Camera Employing the Same" U.S. Appl. No. 12/037,449, filed Feb. 26, 2008.

* cited by examiner

*Primary Examiner* — Sinh Tran
*Assistant Examiner* — Albert Cutler
(74) *Attorney, Agent, or Firm* — Mima Abyad; Wade J. Brady, III; Frederick J. Telecky, Jr.

(57) ABSTRACT

An activity-based system for, and method of, reducing Gr-Gb gain imbalance and a digital camera incorporating the system or the method. In one embodiment, the system includes: (1) a sensor configured to provide a input Bayer pattern array containing amplitudes corresponding to Gr and Gb cells and (2) a processor coupled to the sensor and configured to (2a) compute for at least some of the Gr and Gb cells: activity measures for pluralities of adjacent, same-type cells, green precompensation factors based on the activity measures, averages for the pluralities of adjacent, same-type cells and averages for pluralities of adjacent, opposite-type cells and (2b) use the green precompensation factors, the averages for the pluralities of adjacent, same-type cells and the averages for the pluralities of adjacent, opposite-type cells to form an output Bayer pattern in which the Gr-Gb gain imbalance is reduced.

12 Claims, 8 Drawing Sheets

ACTIVITY-BASED SYSTEM AND METHOD FOR REDUCING GAIN IMBALANCE IN A BAYER PATTERN AND DIGITAL CAMERA EMPLOYING THE SAME

CROSS-REFERENCE TO PROVISIONAL APPLICATION

This application claims the benefit of co-pending U.S. Provisional Application Ser. No. 60/895,882, filed by Sheikh on Mar. 20, 2007, entitled "Digital Camera and Interpolation Method," and co-pending U.S. Provisional Application Ser. No. 60/909,429, filed by Sheikh on Mar. 31, 2007, "Digital Camera and Interpolation Method," commonly assigned with the invention and incorporated herein by reference. Co-pending U.S. patent application Ser. No. 12/037,449, filed by Oizumi on Feb. 26, 2008, entitled "Proximity-Based System and Method for Reducing Gain Imbalance in a Bayer Pattern and Digital Camera Employing the Same," and commonly assigned with the invention and incorporated herein by reference discloses related subject matter.

TECHNICAL FIELD OF THE INVENTION

The invention is directed, in general, to digital image processing and, more specifically, to an activity-based system and method for reducing gain imbalance in a Bayer pattern and a digital camera employing the system or the method.

BACKGROUND OF THE INVENTION

Still imaging and video devices have become a significant part of consumer electronics. Digital cameras, digital camcorders, and video cellular phones are common, and many other new devices are being introduced into and evolving in the market continually. Advances in large resolution charge-coupled device (CCD) and complementary metal-oxide semiconductor (CMOS) image sensors, together with the availability of low-power, low-cost digital signal processors (DSPs), has led to the development of digital cameras with both high resolution (e.g., a five-megacell image sensor with a 2560×1920 cell array) still image and audio/video clip capabilities. In fact, high resolution digital cameras provide quality close to that offered by traditional 35 mm film cameras.

Digital cameras typically contain an "image pipeline" for digital camera control and image processing. Among other things, the image pipeline performs automatic focus, automatic exposure, and automatic white balancing, color filter array (CFA) interpolation, gamma correction, color space conversion, and Joint Photographic Experts Group/Motion Picture Experts Group compression/decompression (JPEG for single images and MPEG for video clips).

The typical color CCD/CMOS sensor consists of a rectangular array of photosites (cells) covered by the CFA; each cell of the CCD/CMOS sensor is covered by a color filter element of the CFA. Most CFAs employ a Bayer pattern of red, green and blue filters. As those skilled in the art understand, a Bayer pattern is a 2×2 array of color cells, a red cell, two green cells and a blue cell. For this reason, the Bayer pattern is sometimes referred to as GRGB. The two green cells are at the diagonal positions. In the horizontal direction, each line has either "R" and "Gr" or "Gb" and "B" where Gr is a green cell in a line with red cells, and Gb is a green cell in a line with blue cells. Green cells form a checkerboard pattern, and R or B cells fill the rest of each line.

The sensor output is an image with each cell amplitude a measure of the intensity of the corresponding filter color of the cell. The CFA interpolation provides the two other color amplitudes for each cell to give the full-color image of the input scene. The image sensor is the key component that determines the basis of the overall image quality. Among the various sensors, CCD sensors and CMOS sensors are the most widely used ones, and the percentage of CMOS sensors is growing.

Although CMOS sensors consume less power and have other advantages over CCD sensors, they suffer several disadvantages as well. One of the disadvantages is that the gain of Gb cells differs from that of Gr cells. This gives rise to so-called Gr-Gb gain imbalance.

Gr-Gb gain imbalance is not only dependent on geometrical location, but also is affected by surrounding R and B cells. Gr-Gb gain imbalance results in different hues of green being rendered given the same input light, which produces image artifacts, namely false textures. Therefore, this gain imbalance needs to be removed.

The straightforward way to remove Gr-Gb gain imbalance is to average green cells with the surrounding four other green cells. This is equivalent to low-pass filtering the green checkerboard. This removes Gr-Gb gain imbalance very well, but it also loses edge sharpness.

Another way to remove Gr-Gb gain imbalance is to use CFA interpolation methods that are insensitive to Gr-Gb gain imbalance. For example, some CFA interpolation methods interpolate RGB colors at the position in between Gb and Gr cells. This way the resulting green amplitude is close to the average of Gb and Gr. This method removes all or a large part of Gr-Gb gain imbalance. The problem with this method is that it is not compatible with many CFA interpolation methods which interpolate RGB colors at the center of each cell. There are other CFA interpolation methods which are insensitive to Gr-Gb gain imbalance; however, use of these methods narrows the choice of CFA interpolation methods. This limits its application areas to certain ranges. Also, in some methods the sharpness of edges in images is reduced.

SUMMARY OF THE INVENTION

To address the above-discussed deficiencies of the prior art, one aspect of the invention provides an activity-based system for reducing Gr-Gb gain imbalance and a digital camera incorporating the system or the method. In one embodiment, the system includes: (1) a sensor configured to provide a input Bayer pattern array containing amplitudes corresponding to Gr and Gb cells and (2) a processor coupled to the sensor and configured to (2a) compute for at least some of the Gr and Gb cells: activity measures for pluralities of adjacent, same-type cells, green precompensation factors based on the activity measures, averages for the pluralities of adjacent, same-type cells and averages for pluralities of adjacent, opposite-type cells and (2b) use the green precompensation factors, the averages for the pluralities of adjacent, same-type cells and the averages for the pluralities of adjacent, opposite-type cells to form an output Bayer pattern in which the Gr-Gb gain imbalance is reduced.

Another aspect of the invention provides an activity-based method of reducing Gr-Gb gain imbalance. In one embodiment, the method includes: (1) providing a input Bayer pattern array containing amplitudes corresponding to Gr and Gb cells, (2) computing for at least some of the Gr and Gb cells: (2a) activity measures for pluralities of adjacent, same-type cells, (2b) green precompensation factors based on the activity measures, (2c) averages for the pluralities of adjacent, same-type cells and (2d) averages for pluralities of adjacent, opposite-type cells and (3) using the green precompensation factors, the averages for the pluralities of adjacent, same-type cells and the averages for the pluralities of adjacent, opposite-type cells to form an output Bayer pattern in which the Gr-Gb gain imbalance is reduced.

Another aspect of the invention provides a digital camera capable of carrying out front-end image processing. In one embodiment, the digital camera includes: (1) a sensor configured to provide a input Bayer pattern array containing amplitudes corresponding to Gr and Gb cells and (2) a processor coupled to the sensor and configured to (2a) compute for at least some of the Gr and Gb cells: activity measures for pluralities of eight adjacent, same-type cells, green precompensation factors based on the activity measures, averages for the pluralities of eight adjacent, same-type cells and averages for pluralities of four adjacent, opposite-type cells and (2b) use the green precompensation factors, the averages for the pluralities of eight adjacent, same-type cells and the averages for the four pluralities of adjacent, opposite-type cells to form an output Bayer pattern in which the Gr-Gb gain imbalance is reduced.

BRIEF DESCRIPTION OF THE DRAWINGS

For a more complete understanding of the invention, reference is now made to the following descriptions taken in conjunction with the accompanying drawings, in which.

DETAILED DESCRIPTION

1. Overview

In certain embodiments to be described, a local-activity-based adaptive prefiltering operation is performed before CFA interpolation to reduce Gr-Gb gain imbalance. In one embodiment, the Gr-Gb gain imbalance is reduced by effectively adaptively blending local green pixel amplitude (value) averages based on local image activity. In a local neighborhood, averages of Gr amplitudes and Gb amplitudes are computed; a measure of local activity is also computed for the same neighborhood centered on the pixel being balanced. The measure of local activity is transformed through a transfer function to a blending factor, and the Gr and Gb amplitude averages are blended accordingly.

Figure 1:
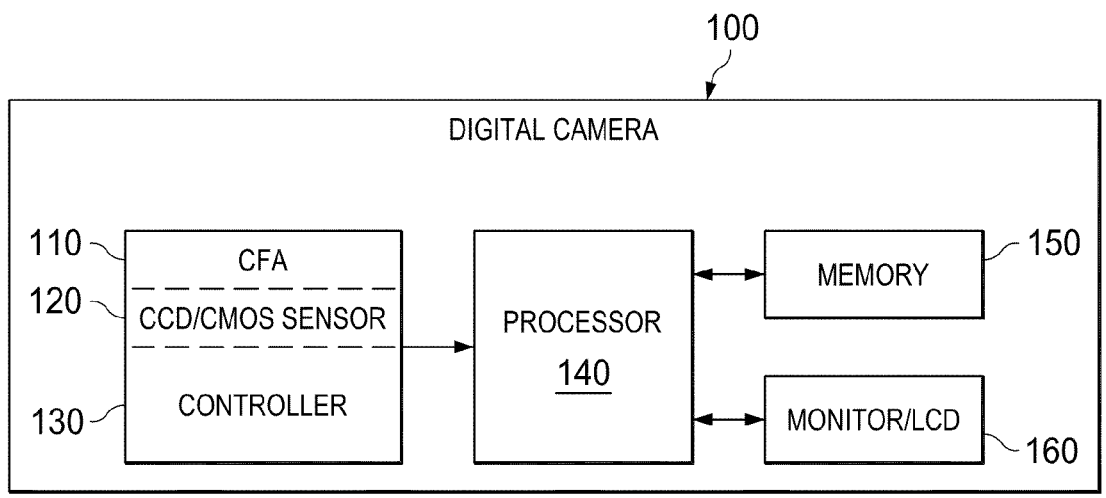
FIG. 1 is a high-level block diagram of a digital camera within which an activity-based system and method for reducing Gr-Gb gain imbalance may be carried out.

Before describing various embodiments of the system and method, various aspects of a digital camera will be described. FIG. 1 is a high level block diagram of one embodiment of a digital camera having a motion sensor and forming an environment within which an activity-based system and method for reducing Gr-Gb gain imbalance may be carried out. Among other things, the camera, generally designated 100, contains a CFA 110 that covers a CCD or CMOS image sensor 120. A controller 130 controls the CCD/CMOS image sensor 120, causing image data to be delivered to a processor 140. The image data may be stored in a memory 150 coupled to the processor 140. The image data may also be displayed on a monitor or liquid crystal display (LCD) 160 coupled to the processor 140.

For purposes of the invention, "processor" is a broad term encompassing not only general-purpose processors such as microprocessors, coprocessors, DSPs and controllers, but also programmable logic arrays (PALs) and special-purpose digital hardware capable of carrying out one or more of the methods described herein.

Figure 2:
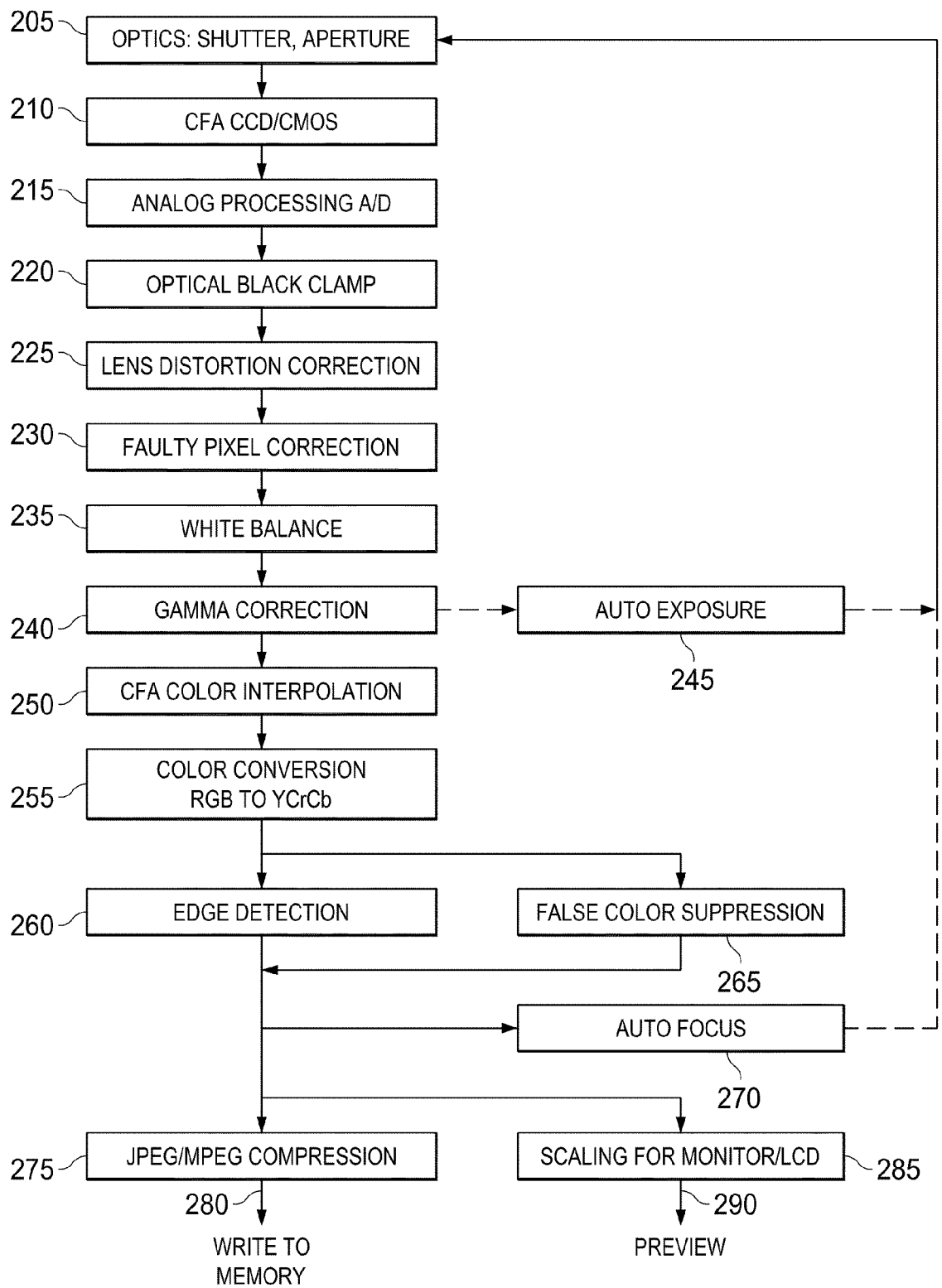
FIG. 2 is a block diagram illustrating prior-art front-end image processing as carried out by one embodiment of the digital camera of FIG. 1.

FIG. 2 is a block diagram illustrating prior-art front-end image processing as carried out by one embodiment of the digital camera 100. An optical system 205 includes a lens, a shutter and an aperture. A CCD 210 receives an image through the optical system 205. An A/D converter 215 converts the analog output of the CCD 210 to a digital image. An optical black clamp 220 removes residual offsets in the digital image. A lens distortion corrector 225 removes known lens distortion from the digital image. A faulty pixel corrector 230 fills in known faulty pixels in the digital image. A white balancer 235 color-corrects the digital image to adjust the color temperature of the digital image. A gamma corrector 240 adjusts gamma (which relates luminance to pixel level) of the digital image. The resulting digital image is then processed by an auto exposure unit 245 that controls the shutter of the optical system 205. The digital image is also provided to a CFA unit 250, which performs color interpolation on the digital image.

A color converter 255 converts the digital image from one color space (e.g., RGB) to another (e.g., YCbCr). An edge detector 260 and a false color corrector 265 respectively detect edges and corrects for false colors in the digital image. The output of the edge detector 260 and the false color corrector 265 is provided to an autofocus (AF) unit 270 that controls the lens of the optical system 205. The output of the edge detector 260 and the false color corrector 265 is provided to a JPEG/MPEG compression unit 275 for conversion into the appropriate one of those well-known still image and video compression standards. The compressed output 280 can then be written to external memory (e.g., synchronous dynamic random-access memory, or SDRAM). The output of the edge detector 260 and the false color corrector 265 is also provided to a scaling unit 285 to scale the digital image to preview 290 on a monitor, such as a liquid crystal display (LCD) on the back of the digital camera.

Figure 3:
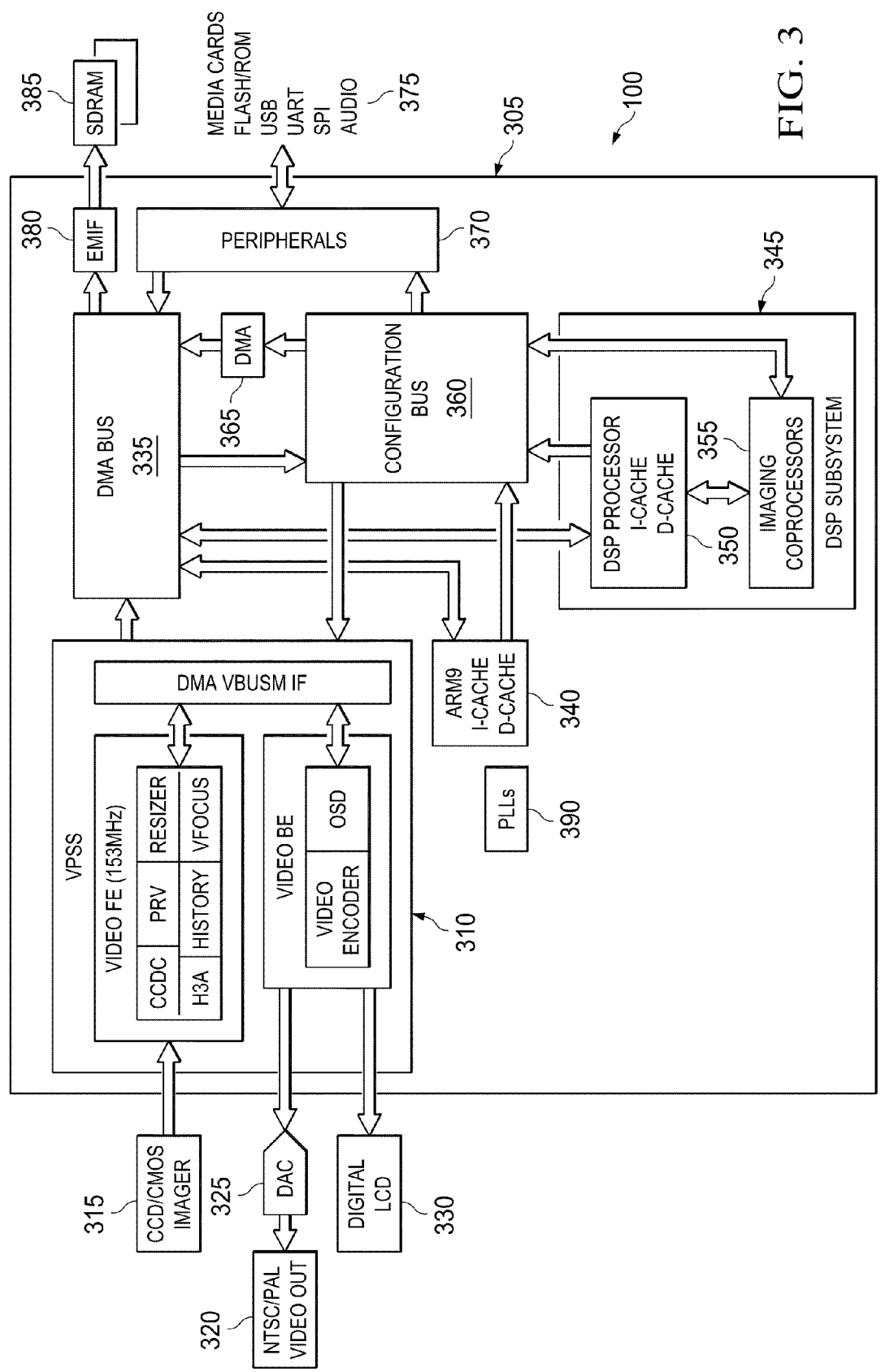
FIG. 3 is a block diagram illustrating one embodiment of circuitry contained in the digital camera of FIG. 1.

FIG. 3 is a block diagram illustrating one embodiment of circuitry contained in the digital camera 100 of FIG. 1. The digital camera contains image processing circuitry 305. The image processing circuitry 305 contains a video processing subsystem (VPSS) 310 that receives images from a CCD/

CMOS image sensor 315 and performs much if not all of the front-end image processing detailed in FIG. 2. The VPSS 310 provides output to a National Television System Committee (NTSC) or Phase Alternating Line (PAL) video output 320, whichever is appropriate, via digital-to-analog converter 325, a digital LCD 330 (typically the LCD on the back of the digital camera 100) and a direct memory access (DMA) bus 335.

The DMA bus conveys data among a processor (e.g., a commercially available ARM9) with its associated instruction and data caches 340, a DSP subsystem 345 (containing a DSP with its associated instruction and data caches 350 and imaging processors 355), a configuration bus 360, a DMA controller 365, various peripheral interfaces 370 and an external memory interface (EMIF) 380. The peripheral interfaces 370 may lead to one or more peripheral devices 375, such as media cards, flash, read-only memory (ROM), a universal serial bus (USB), etc. The EMIF 380 provides an interface to external memory, such as SDRAM 385. Various phase-locked loops (PLLs) 390 provide clock signals to synchronize the operation of the aforementioned circuitry.

Figure 4:
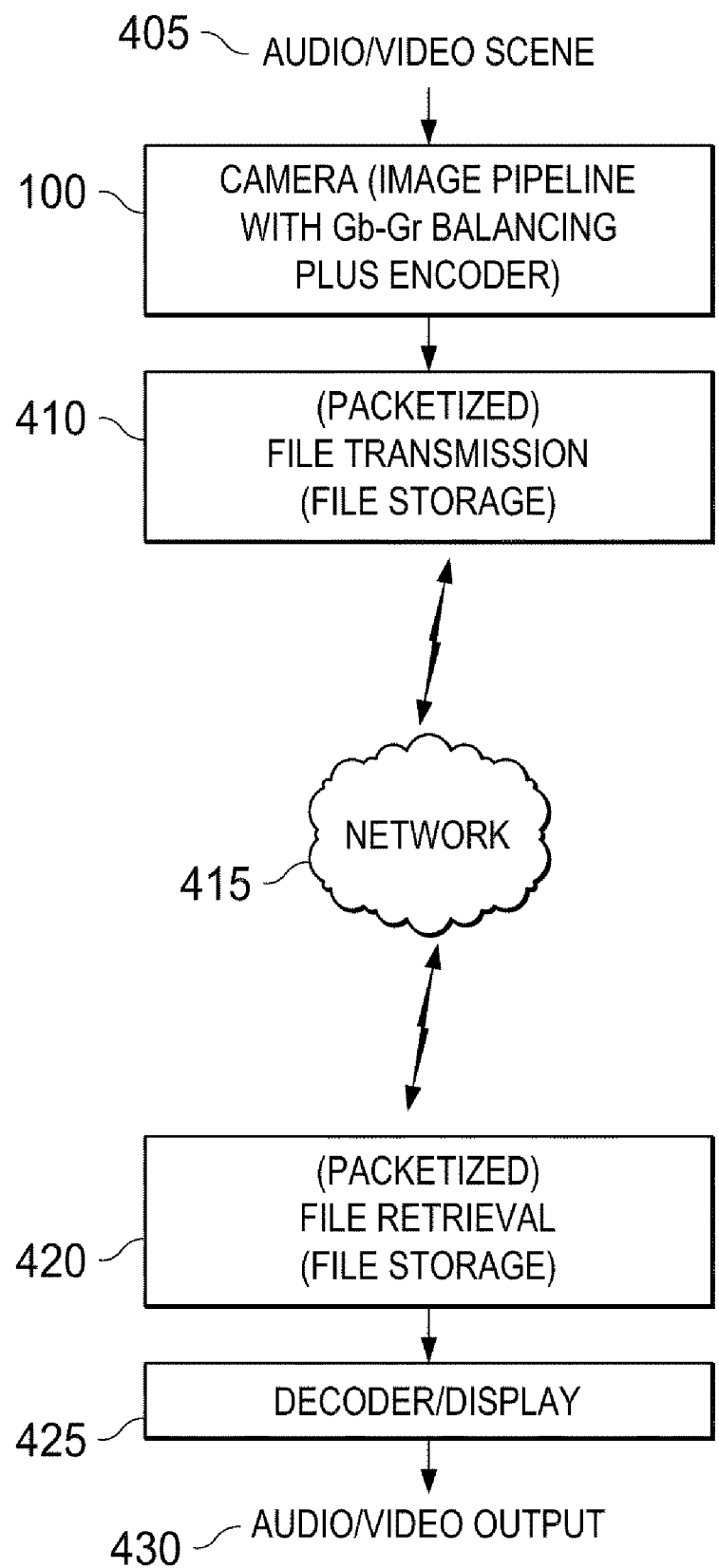
FIG. 4 is a block diagram illustrating one embodiment of network communication carried out by the digital camera of FIG. 1.

FIG. 4 is a block diagram illustrating one embodiment of network communication carried out by the digital camera of FIG. 1. The digital camera 100 captures an audio-visual scene 405 and creates one or more digital still or video images, perhaps including audio. The digital camera 100 may thereafter divide the digital images into packets and create a transmission 410 to a network 415 to cause them to be stored as one or more files (not shown). The one or more files may thereafter be retrieved, whereupon they are again divided into packets and a transmission 420 created. The retrieved digital images 420 may then be passed through a decoder 425 and displayed as an audio/video output 430.

Having described various aspects of a digital camera and its potential interaction with a network, various embodiments of the system and method will now be described.

Figure 5:
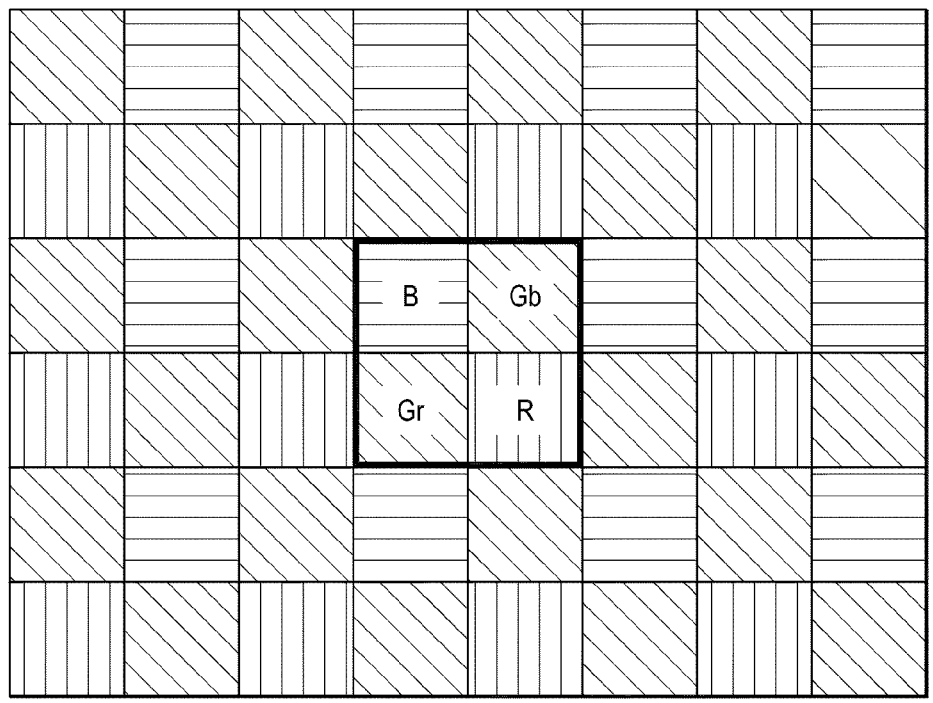
FIG. 5 is a diagram schematically illustrating a CFA containing a Bayer pattern.

FIG. 5 is a diagram schematically illustrating a CFA containing a Bayer pattern. The CFA is a Cartesian array of red, green and blue cells. Because the CFA is a color array and FIG. 5 is rendered in black-and-white, crosshatching conforming to ¶608.02 of the U.S. Patent and Trademark Office's Manual of Patent Examining Procedure has been used to designate colors. Specifically, vertical crosshatching designates red cells, upper-left-pointing diagonal crosshatching designates green cells, and horizontal crosshatching designates blue cells. A representative unit Bayer pattern is outlined in black line in the center of the CFA and consists of one red cell R, two green cells Gr, Gb and one blue cell B.

Figure 6A:
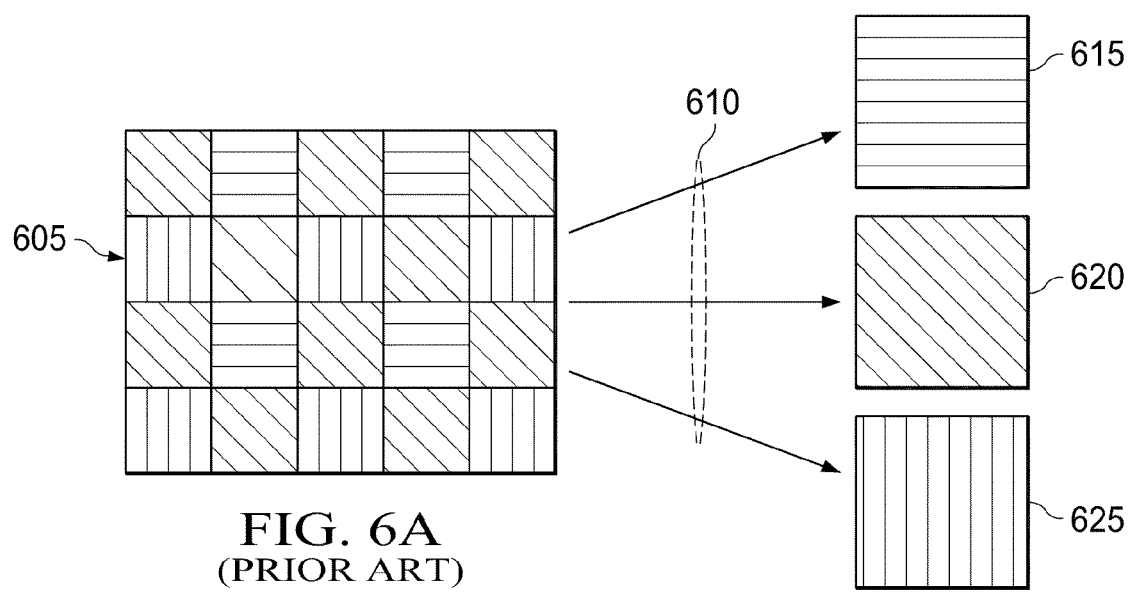
FIGS. 6A and 6B are diagrams schematically illustrating a prior art technique of CFA interpolation and the consequences that result from a Gr-Gb gain imbalance in the Bayer pattern of FIG. 5.
Figure 6B:
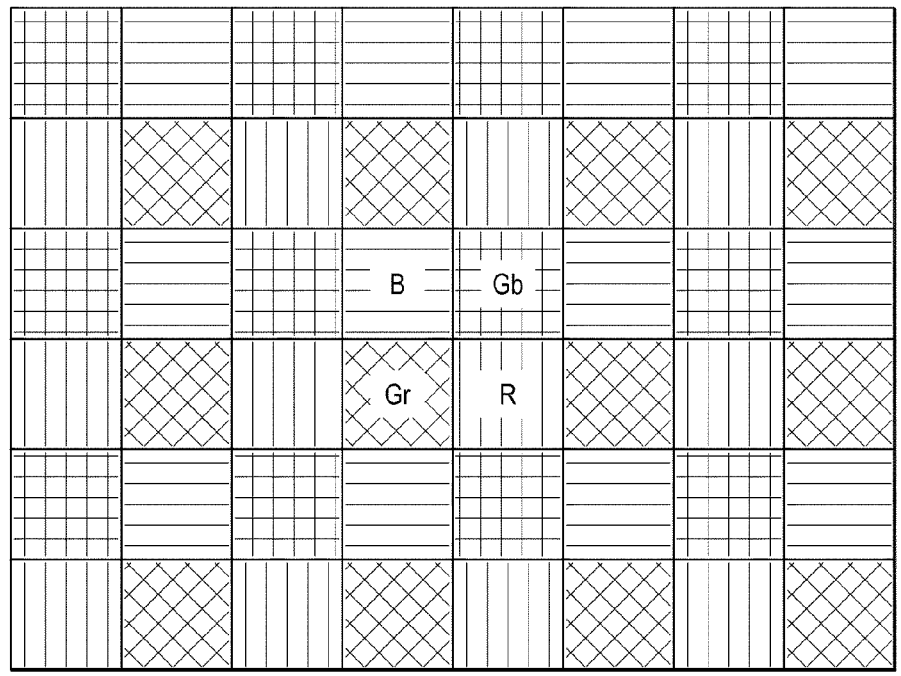

FIGS. 6A and 6B are diagrams schematically illustrating a prior art technique of CFA interpolation and the consequences that result from a Gr-Gb gain imbalance in the Bayer pattern of FIG. 5. As those skilled in the art are familiar, a Bayer pattern array 605 is provided to a CFA interpolation process 610, resulting in three full-color arrays: a blue array 615, a green array 620 and a red array 625. Unfortunately, the green array 620 contains artifacts resulting from the presence of gain-imbalanced Gr and Gb. FIG. 6B represents this gain imbalance in that the crosshatching of Gr cells differs from the crosshatching of Gb cells.

Figure 7:
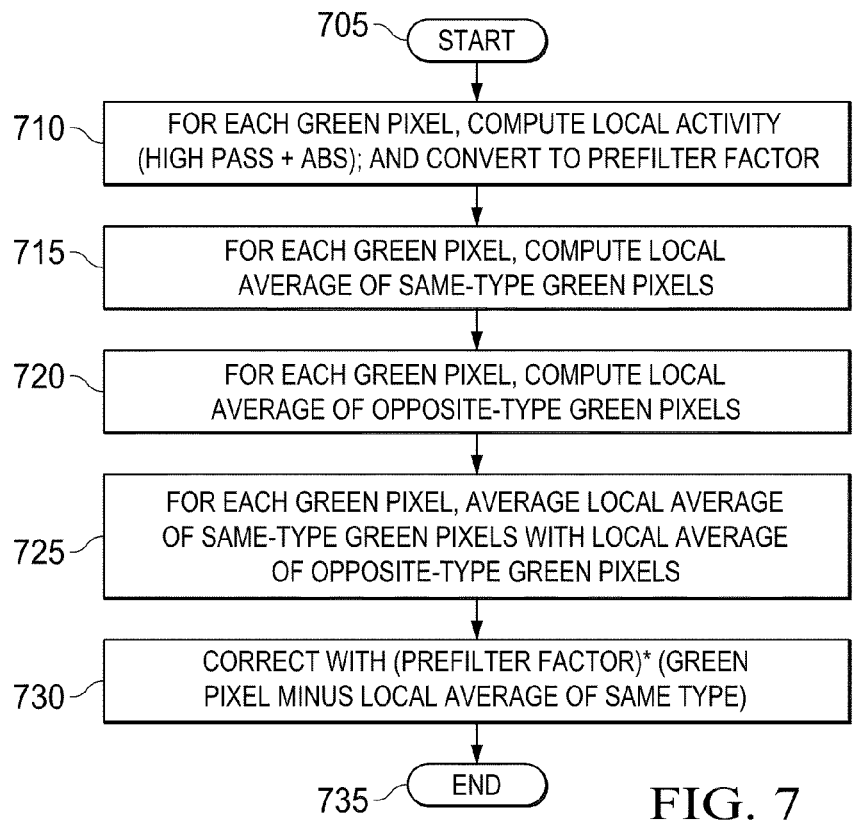
FIG. 7 is a flowchart of one embodiment of an activity-based method of reducing Gr-Gb gain imbalance.

FIG. 7 is a flowchart of one embodiment of an activity-based method of reducing Gr-Gb gain imbalance. The method begins in a start step 705, in which a Bayer pattern array is provided. For each green pixel (Gr and Gb), a local activity (defined for purposes of the embodiment of FIG. 7 as being an absolute value of a rapidly varying component of changes in the neighborhood) is computed and then converted to yield a prefilter factor in a step 710. Then, in a step 715, a local average of same-type green pixels is computed for each green pixel. Next, in a step 720, a local average of opposite-type green pixels is computed for each green pixel. Then, in a step 725, the local average of same-type green pixels is averaged with the local average of opposite-type green pixels for each green pixel. Next, in a step 730, the average of the two averages computed in the step 725 is corrected with a prefilter factor multiplied by the difference between the amplitude of the green pixel and the local average of same-type green pixels computed in the step 715. The resulting Gr-Gb balanced Bayer pattern array is provided in an end step 735.

2. Specific Embodiments

Figures 8, 9:
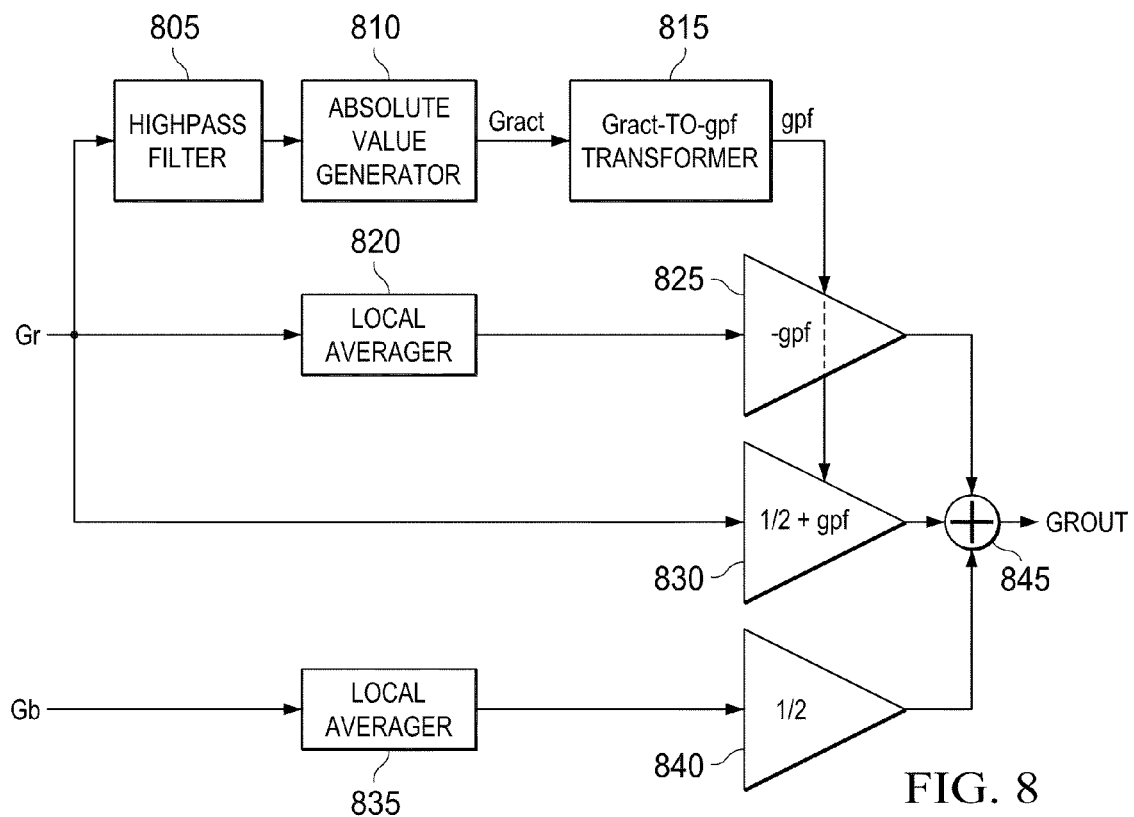
FIG. 8 is a block diagram of one embodiment of an activity-based system for reducing Gr-Gb gain imbalance.
FIG. 9 is a diagram illustrating pixel and filter weight labeling over a 5×5 pixel neighborhood.

FIG. 8 is a block diagram of one embodiment of an activity-based system for reducing Gr-Gb gain imbalance. The system effectively adaptively blends local green pixel amplitude (value) averages based on local image activity. For ease of presentation, the system of FIG. 8 is annotated for the case in which the pixel being balanced is a Gr pixel. Thus, same-type pixels are Gr pixels, and opposite-type pixels are Gb pixels. The same system is employed to balance Gb pixels, in which case the annotations are reversed; Gr becomes Gb, and Gb becomes Gr.

In general, the average of Gr amplitudes and the average of Gb amplitudes are computed in a local neighborhood; a measure of local activity is also computed for the same neighborhood centered on the pixel being balanced. The measure of local activity is transformed through a transfer function to a blending factor, and the Gr and Gb amplitude averages are blended accordingly. In the blending process, any imbalance in the blending of average amplitudes is reduced by blending the center pixel amplitude. The following provides details.

In particular, a Gr pixel amplitude is provided to a highpass filter 805 that contains other Gr pixel amplitudes in the local neighborhood and is configured to filter out all but a rapidly varying component of changes in Gr amplitude in the local neighborhood. A preset threshold amplitude (not shown) determines the threshold above which changes are considered rapidly varying. The output of the highpass filter 805 is provided to an absolute value generator 810 that computes the absolute value thereof. The output of the absolute value generator 810, which represents local Gr activity, is provided to a Gract-to-gpf transformer 815 that transforms the local activity into a prefilter factor, gpf, for example in accordance with the piecewise linear transfer function of FIG. 10.

The Gr pixel amplitude is also provided to a local averager 820 that contains other Gr pixel amplitudes in the local neighborhood and is configured to compute a local Gr average therefrom. A multiplier 825 then multiplies the local Gr average by negative gpf. The Gr pixel amplitude is also provided to a multiplier 830 that multiplies the Gr pixel amplitude by the sum of one-half and gpf.

The Gb pixel amplitude is provided to a local averager 835 that contains other Gb pixel amplitudes in the local neighborhood and is configured to compute a local Gb average therefrom. A multiplier 840 then divides the local Gb average by two. Finally, a summing junction 845 adds the output of the multipliers 825, 830, 840. The result is a gain-compensated amplitude of the Gr pixel amplitude, Grout.

FIG. 9 is a diagram illustrating pixel and filter weight labeling over a 5×5 pixel neighborhood centered on a green pixel. The center green pixel amplitude has an amplitude $G_0$, and the surrounding four closest green pixels have amplitudes $G_a$, $G_b$, $G_c$, and $G_d$. $G_0$ and $\{G_a, G_b, G_c, G_d\}$ are of opposite types. That is, when $G_0$ is a Gr pixel, $G_a$, $G_b$, $G_c$, and $G_d$ are all Gb pixels; and when $G_0$ is a Gb pixel, $G_a$, $G_b$, $G_c$, and $G_d$ are all Gr pixels. The other eight green pixels in the 5×5 neighborhood have amplitudes $G_1, G_2, \ldots, G_8$ and are of the same type as $G_0$. The Gr-Gb balanced output amplitude $G_{out}$ for the center green pixel (with input amplitude $G_0$) is derived according to the following steps (illustrated in FIG. 8 for $G_0$, a Gr pixel):

(a) Highpass filter the nine $G_0$ type pixels in the 5×5 neighborhood and take the absolute value to give the activity $G_{act}$. One embodiment of a highpass filter has weights $w_1=w_3=w_6=w_8=0$, $w_2=w_4=w_5=w_7=-\frac{1}{8}$, and $w_0=\frac{1}{2}$; so:

$$G_{act} = \left| \sum_{0 \le j \le 8} w_j G_j \right| = |G_0 - (G_2 + G_4 + G_5 + G_7)/8|/2.$$

Other filters could be used, but this filter has a simple shift implementation.

Figure 10:
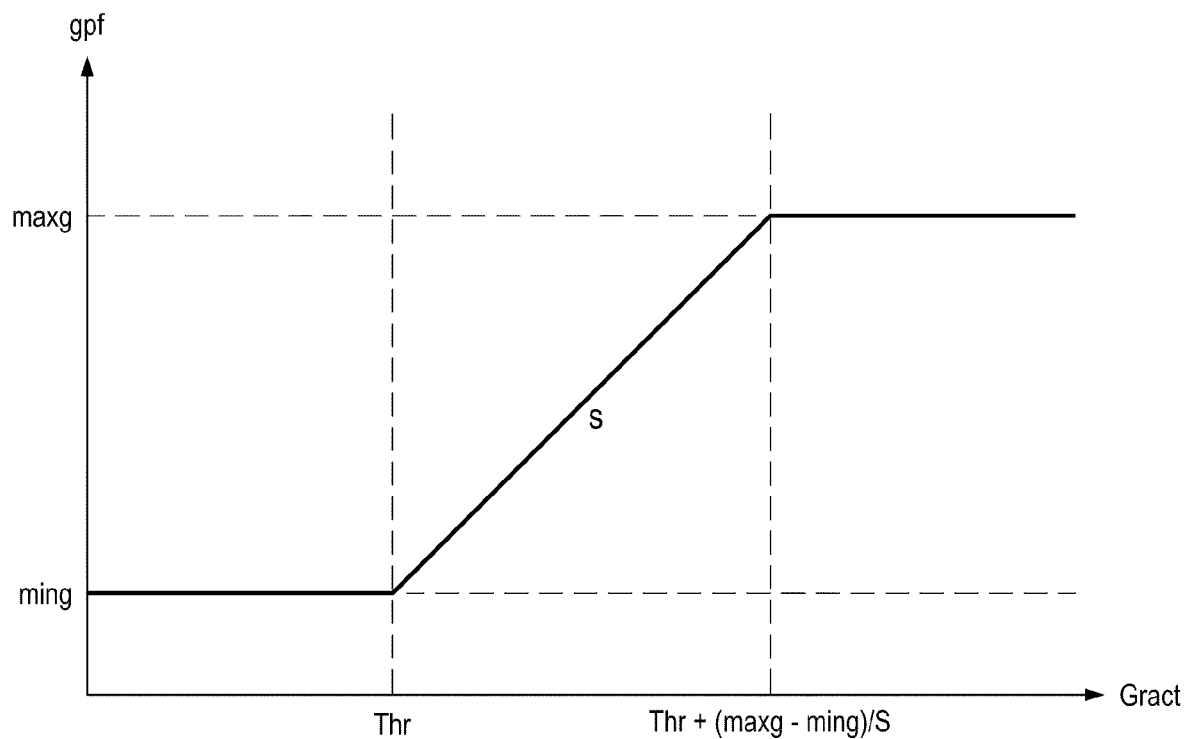
FIG. 10 is a graph illustrating one embodiment of a piecewise linear transfer function that may be employed in the method of FIG. 7 or the system of FIG. 8.

(b) Compute a green prefilter factor, gpf, from the activity, $G_{act}$, using a transfer function. FIG. 10 is the graph of one embodiment of a piecewise linear transfer function (with minimum green amplitude ming, a maximum green amplitude maxg, a threshold Thr and a slope S) that computes gpf as:

| | |
|---|---|
| ming | for $G_{act}$ < Thr |
| ming + S * (Gract − Thr) | for Thr $\le G_{act}$ < Thr + (maxg − ming)/S |
| maxg | for Thr + (maxg − ming)/S $\le G_{act}$ |

Other transfer functions with similar shape could also be used, including a simple threshold (infinite slope). For 12-bit data (pixel amplitudes in the range of 0 to 4095), typical parameter values may be: ming=0, maxg=0.5, Thr=30, and S=0.003. These parameter values may be tuned for different quality tradeoffs, as will be explained in greater detail below.

(c) Compute a local weighted average of same-type pixel amplitudes. One embodiment of such an average has weights $w_1=w_3=w_6=w_8=\frac{1}{16}$, $w_2=w_4=w_5=w_7=\frac{1}{8}$, and $w_0=\frac{1}{4}$; so $$G_{loc} = \sum_{0 \le j \le 8} w_j G_j$$
$$= (G_0 + (G_2 + G_4 + G_5 + G_7 + (G_1 + G_3 + G_6 + G_8)/2)/2)/4.$$

Again, other averages could be used, but this average has a simple shift implementation.

(d) Compute a local average of opposite-type pixels. One embodiment of such an average has weights $w_a=w_b=w_c=w_d=\frac{1}{4}$; so $$G_{loc\text{-}opp} = \sum_{a \le j \le d} w_j G_j$$
$$= (G_a + G_b + G_c + G_d)/4.$$

As before, other averages could be used, but this average has a simple shift implementation.

(e) Compute the Gr-Gb balanced output as the average of the input green pixel with the opposite-type green local average plus a correction term equal to the scaled difference of the input minus the local average of the same type. Explicitly, $$G_{out} = (G_0 + G_{loc\text{-}opp})/2 + gpf * (G_0 - G_{loc})$$
$$= (1/2 + gpf) * G_0 + 1/2 * G_{loc\text{-}opp} - gpf * G_{loc}.$$

The correction term, $gpf*(G_0 - G_{loc})$, is small for low activity because gpf is small, and for small activity $G_0$ is likely close to $G_{loc}$, so the balanced output is roughly a local average of both Gr and Gb type pixels. For high activity, the correction term emphasizes $G_0$ over the local averages, so edges are preserved. Indeed, edge enhancements can be applied after the Gr-Gb balancing without significantly increasing artifacts.

The final amplitude $G_{out}$ replaces the original $G_0$ amplitude of the input Bayer pattern. After all green pixels are processed in this manner, the Gr-Gb balanced Bayer pattern is sent to the rest of the image pipeline processing stages to make the final full color output (e.g., by CFA interpolation).

Note that the illustrated embodiments effectively remove Gr-Gb gain imbalance while maintaining edge sharpness. The compensation process is independent of the CFA interpolation process, so it is applicable to any CFA interpolation method.

3. Tuning

As mentioned above, the transfer function parameters can be tuned for different quality tradeoffs. In particular, low ming values cause more blur, and high maxg values cause more enhancement artifacts. It has been found that, for many embodiments, maxg should not be greater than ½ except for very clean images. For low-light conditions, ming and maxg should both be decreased, and Thr should be increased. For high-light conditions, ming and maxg should be increased and Thr decreased.

Indeed, the green subarray of an image can be highpass filtered and absolute values taken to find $G_{act}$ at each green pixel. Thr and S may then be chosen so that: (i) $G_{act}$ may be less than Thr in flat regions; (ii) $G_{act}$ may be greater than Thr+(maxg−ming)/S in high textured regions; and (iii) $G_{act}$ should be in between Thr and Thr+(maxg−ming)/S in low textured regions (represented in the sloped portion of the transfer function of FIG. 10.

4. Experimental Results

Figure 11A:
FIGS. 11A and 11B are photographs illustrating experimental results regarding application of the method of FIG. 7 or the system of FIG. 8.
Figure 11B:

FIGS. 11A and 11B are photographs illustrating experimental results regarding application of the method of FIG. 7 or the system of FIG. 8. For the experiment, a Bayer pattern image with Gr-Gb gain imbalance was used; that imbalance was inherent in the image captured using a CMOS sensor. FIG. 11A shows a small portion of the original image after CFA interpolation but without Gr-Gb balancing, and FIG. 11B shows the same portion but with Gr-Gb balancing as described herein.

5. Modifications

The systems and methods described herein can be modified in various ways while retaining the feature of a local-activity-based adaptive averaging to reduce Gr-Gb gain imbalance.

For example, the size of the neighborhoods for weighted averaging could be increased from 3×3 to 7×7 or larger. The weights could be changed. The nature of the transfer function could be modified. The algorithm could be made directionally adaptive; that is, different low-pass filters could be selected based on detection of local edge orientation. Information from other color channels could be used to adjust the correction term. The multiplication factor for $G_{loc\text{-}opp}$ could be modified from one-half with a corresponding adjustment in other parts of the equation in which blending takes place.

Those skilled in the art to which the invention relates will appreciate that other and further additions, deletions, substitutions and modifications may be made to the described embodiments without departing from the scope of the invention.

What is claimed is:

1. An activity-based system for reducing Gr-Gb gain imbalance, comprising:
 a sensor configured to provide an input Bayer pattern array containing amplitudes corresponding to Gr and Gb cells; and
 a processor coupled to said sensor and configured to compute for at least some of said Gr and Gb cells:
  activity measures for pluralities of adjacent, same-type cells,
  green precompensation factors based on said activity measures,
  averages for said pluralities of adjacent, same-type cells, and
  averages for pluralities of adjacent, opposite-type cells and
 use said green precompensation factors, said averages for said pluralities of adjacent, same-type cells and said averages for said pluralities of adjacent, opposite-type cells to form an output Bayer pattern in which said Gr-Gb gain imbalance is reduced, wherein said green precompensation factors are further based on a piecewise linear transfer function which is

| | |
|---|---|
| ming | for $G_{act} <$ Thr |
| ming + S * (Gract − Thr) | for Thr $\leq G_{act} <$ Thr + (maxg − ming)/S |
| maxg | for Thr + (maxg − ming)/S $\leq G_{act}$, | wherein Gract is the local $G_r$ activity and $G_{act} = |\Sigma_{0 \leq i \leq 8} w_i G_i|$ and wherein ming is a minimum green amplitude, maxg is a maximum green amplitude, Thr is a threshold and S is a slope.

2. The system as recited in claim 1 wherein said pluralities consist of eight adjacent, same-type cells and four adjacent, opposite-type cells.

3. The system as recited in claim 1 wherein said processor uses only said green precompensation factors, said averages for said pluralities of adjacent, same-type cells and said averages for said pluralities of adjacent, opposite-type cells to form said output Bayer pattern.

4. The system as recited in claim 1 wherein said processor use a multiplication factor of one-half to blend said green precompensation factors, said averages for said pluralities of adjacent, same-type cells and said averages for said pluralities of adjacent, opposite-type cells to form said output Bayer pattern.

5. The system as recited in claim 1 wherein said processor employs said output Bayer pattern to perform a color filter array interpolation.

6. An activity-based method of reducing Gr-Gb gain imbalance, comprising:
 providing an input Bayer pattern array containing amplitudes corresponding to Gr and Gb cells;
 computing for at least some of said Gr and Gb cells:
  activity measures for pluralities of adjacent, same-type cells,
  green precompensation factors based on said activity measures,
  averages for said pluralities of adjacent, same-type cells, and
  averages for pluralities of adjacent, opposite-type cells; and
 using said green precompensation factors, said averages for said pluralities of adjacent, same-type cells and said averages for said pluralities of adjacent, opposite-type cells to form an output Bayer pattern in which said Gr-Gb gain imbalance is reduced, wherein said green precompensation factors are further based on a piecewise linear transfer function which is

| | |
|---|---|
| ming | for $G_{act} <$ Thr |
| ming + S * (Gract − Thr) | for Thr $\leq G_{act} <$ Thr + (maxg − ming)/S |
| maxg | for Thr + (maxg − ming)/S $\leq G_{act}$, | wherein Gract is the local $G_r$ activity and $G_{act} = |\Sigma_{0 \leq j \leq 8} w_j G_j|$ and wherein ming is a minimum green amplitude, maxg is a maximum green amplitude, Thr is a threshold and S is a slope.

7. The method as recited in claim 6 wherein said pluralities consist of eight adjacent, same-type cells and four adjacent, opposite-type cells.

8. The method as recited in claim 6 wherein said using consists of using only said green precompensation factors, said averages for said pluralities of adjacent, same-type cells and said averages for said pluralities of adjacent, opposite-type cells to form said output Bayer pattern.

9. The method as recited in claim 6 wherein said using comprises using a multiplication factor of one-half to blend said green precompensation factors, said averages for said pluralities of adjacent, same-type cells and said averages for said pluralities of adjacent, opposite-type cells to form said output Bayer pattern.

10. The method as recited in claim 6 further comprising employing said output Bayer pattern to perform a color filter array interpolation.

11. A method of Bayer pattern Gr-Gb gain imbalance reduction, comprising the steps of:
 (a) providing an input Bayer pattern array of pixel amplitudes for first, second, third, . . . , Nth green pixels where N is a positive integer;
 (b) for said first green pixel of said Bayer pattern, computing an activity;
 (c) computing a prefilter factor from said activity;
 (d) computing a first local weighted average of amplitudes for green pixels of the same type as said first green pixel;
 (e) computing a second local weighted average of amplitudes for green pixels of the opposite type of said first green pixel;
 (f) computing a Gr-Gb balanced output as the average of the amplitude of said first green pixel with said second local weighted average plus a correction term equal to the product of said prefilter factor multiplied by the difference of the amplitude of said first green pixel minus said first local weighted average;
 (g) for each of said second, third, . . . , Nth green pixels, repeating said steps (b)-(f) with said each green pixel in place of said first green pixel to yield a Gr-Gb balanced output for said each green pixel; and
 (h) forming a Gr-Gb balanced Bayer pattern array of pixel amplitudes using said Gr-Gb balanced outputs.

12. A digital camera, comprising:
(i) a sensor with Bayer pattern output;
(ii) an image pipeline coupled to said sensor; and
(iii) a Bayer pattern Gr-Gb balancer coupled to said image pipeline, said Gr-Gb balancer operable to:
(a) for a first green pixel of a Bayer pattern array of pixel amplitudes, computing an activity;
(b) computing a prefilter factor from said activity;
(c) computing a first local weighted average of amplitudes for green pixels of the same type as said first green pixel;
(d) computing a second local weighted average of amplitudes for green pixels of the opposite type of said first green pixel;
(e) computing a Gr-Gb balanced output as the average of the amplitude of said first green pixel with said second local weighted average plus a correction term equal to the product of said prefilter factor multiplied by the difference of the amplitude of said first green pixel minus said first local weighted average;
(f) for each of second, third, . . . , Nth green pixels of said Bayer pattern array of pixel amplitudes with N a positive integer, repeating said steps (a)-(e) with said each green pixel in place of said first green pixel to yield a Gr-Gb balanced output for said each pixel; and
(g) forming a Gr-Gb balanced Bayer pattern array of pixel amplitudes using said Gr-Gb balanced outputs.

* * * * *